(12) United States Patent
Ueno

(10) Patent No.: US 6,288,797 B1
(45) Date of Patent: Sep. 11, 2001

(54) IMAGE DENSITY CORRECTION DEVICE AND IMAGE DENSITY CORRECTION METHOD, AND IMAGE READING DEVICE AND IMAGE FORMING APPARATUS

(75) Inventor: Sueo Ueno, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/070,929

(22) Filed: May 1, 1998

(30) Foreign Application Priority Data

May 14, 1997 (JP) .................................................. 9-124113

(51) Int. Cl.[7] .................................................. G03B 27/80
(52) U.S. Cl. .......................................... 358/443; 358/475
(58) Field of Search ................................... 358/475, 447, 358/461, 443; 355/402–404, 35, 83, 115

(56) References Cited

U.S. PATENT DOCUMENTS

| 4,496,982 | 1/1985 | Levine ................................. 358/221 |
| 4,593,319 | 6/1986 | Kadedodi et al. ................... 358/213 |
| 4,757,386 | 7/1988 | Sanner ........................... 358/213.26 |
| 4,821,073 | * 4/1989 | Backus et al. ......................... 355/68 |
| 5,162,841 | * 11/1992 | Terashita ................................ 355/38 |
| 5,402,249 | 3/1995 | Koseki et al. ....................... 358/446 |
| 5,748,857 | * 5/1998 | Nakamura et al. ................... 358/1.9 |
| 5,892,573 | * 4/1999 | Takahashi et al. ..................... 355/69 |

FOREIGN PATENT DOCUMENTS

| 0 376 265 | 7/1990 | (EP) . |
| 6-189130 | 7/1994 | (JP) . |

* cited by examiner

Primary Examiner—Thomas D. Lee
Assistant Examiner—Stephen Brinich
(74) Attorney, Agent, or Firm—Foley & Lardner

(57) ABSTRACT

According to a quadruplex CCD of the present invention, an AGC-M0 circuit which is connected to an output terminal OS1 operates to make an electric current of a predetermined value flow into a differential amplifying circuit with use of the differential amplifying circuit, a terminal-based detection circuit, the other differential amplifying circuit, a comparison circuit, a reference control value, a reference current generating circuit, and a voltage holding circuit. The comparison result obtained by the comparison circuit is output to the AGC-S1, AGC-S2, and the AGC-S3 circuits, as a reference value of the AGC circuits. With use of the reference control value obtained in this manner, the difference in image density of the image obtained by the quadruplex CCD is corrected by the AGC-S1 circuit connected to an output terminal OS2, the AGC-S2 circuit connected to an output terminal OS3, and the AGC-S3 circuit connected to an output terminal OS4.

16 Claims, 9 Drawing Sheets

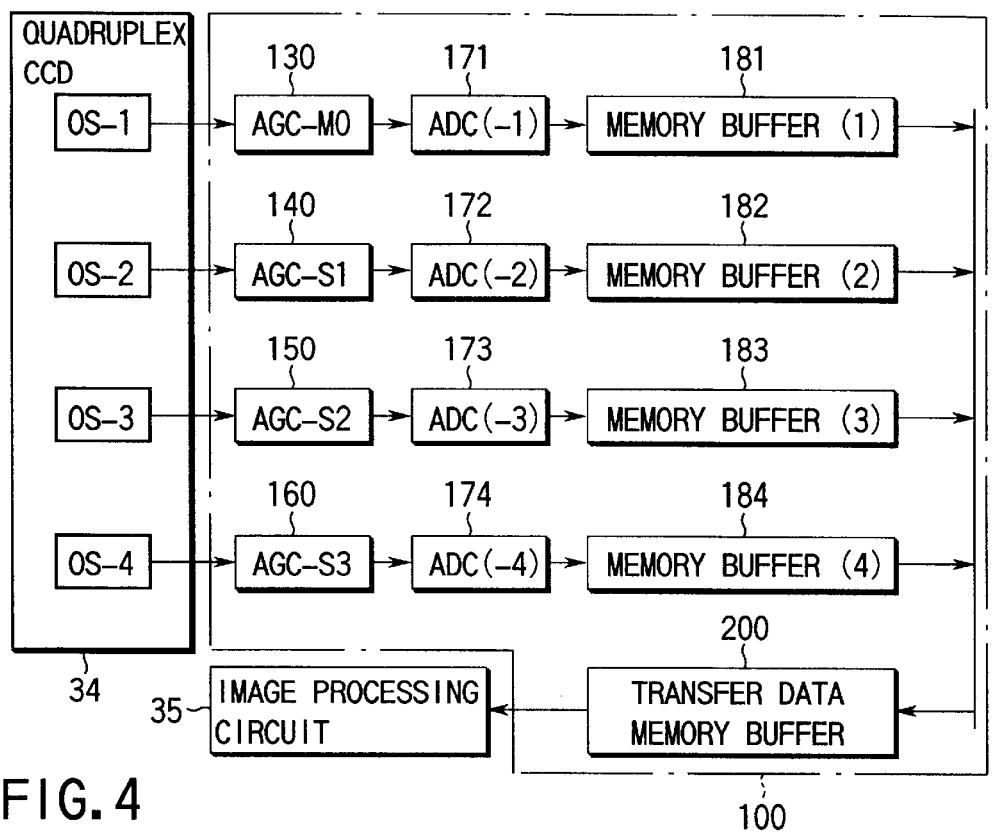

FIG. 6A

MEMORY BUFFER NO.

| M0001 | M0002 | M0003 | M0004 | M0005~M1871 | M1872 | M1873 | M1874 | M1875 |
|---|---|---|---|---|---|---|---|---|

FIG. 6B

MEMORY BUFFER (OS1) /181

| S1 | S3 | S5 | S7 | S9~S3741 | S3743 | S3745 | S3747 | S3749 |
|---|---|---|---|---|---|---|---|---|

FIG. 6C

MEMORY BUFFER (OS2) /182

| S2 | S4 | S6 | S8 | S10~S3742 | S3744 | S3746 | S3748 | S3750 |
|---|---|---|---|---|---|---|---|---|

FIG. 6D

MEMORY BUFFER (OS3) /183

| S7499 | S7497 | S7495 | S7493 | S7491~S3759 | S3757 | S3755 | S3753 | S3751 |
|---|---|---|---|---|---|---|---|---|

FIG. 6E

MEMORY BUFFER (OS4) /184

| S7500 | S7498 | S7496 | S7494 | S7492~S3759 | S3758 | S3756 | S3754 | S3752 |
|---|---|---|---|---|---|---|---|---|

FIG. 7A

TRANSFER DATA MEMORY BUFFER NO.

| T0001 | T0002 | T0003 | T0004 | T0005~T7496 | T7497 | T7498 | T7499 | T7500 |
|---|---|---|---|---|---|---|---|---|

FIG. 7B

DATA ARRANGEMENT IN TRANSFER DATA MEMORY BUFFER

| S0001 | S0002 | S0003 | S0004 | S0005~T7496 | S7497 | S7498 | S7499 | S7500 |
|---|---|---|---|---|---|---|---|---|

200

IMAGE DENSITY CORRECTION DEVICE AND IMAGE DENSITY CORRECTION METHOD, AND IMAGE READING DEVICE AND IMAGE FORMING APPARATUS

BACKGROUND OF THE INVENTION

This invention relates to an image density correction device for correcting an image density difference in an image read from an original document by a CCD (a photoelectric converting element), and the method thereof, and an image reading device using the CCD, and an image forming apparatus such as an electronic copying machine which forms an image by using the image reading apparatus.

In the conventional image forming apparatus such as an electronic copying machine and a facsimile machine, pixel data transfer frequency by the image data reading device such as a CCD which reads an image from an original document sheet is increased as image data reading speed is increased. Accordingly, the control of the signals output from the CCD will become difficult. In order to ease the signal control, the pixels of the conventional CCD have been divided into two groups: odd and even pixels. In recent years, a quadruplex CCD in which the number of the pixel groups is increased by dividing the odd and even pixel groups respectively into first and second half pixel groups, i.e., front and rear pixel groups in the main scanning direction has been proposed. According to this proposal, the pixel data transfer frequency is decreased into a quarter of that of the CCD which does not divide pixels, to ease the processing of the signal.

In outputting image signals of the divided four pixel groups, however, the outputs of the four pixel groups respectively pass through the corresponding buffer amplifiers which are independent from each other. If the offset voltage of the four buffer amplifiers are different from each other, the image density of the read image may be affected thereby. For example, in the case where an image having a neutral tint (e.g. a gray chart) is read to precisely obtain fine difference in gradation, the offset voltages of the buffer amplifiers are respectively added to the voltage level of the original image density of the four pixel regions, with a result that the read image has four image densities.

This difference in image density is also caused by the CCD dividing the image data into odd and even pixel groups, of course. However, the odd and even pixels are alternately arranged, and thus the image density difference between the odd and even pixels is not clearly seen since the pixels are dispersed in a formed image in a marbled manner. While, in the image read by the above-mentioned quadruplex CCD, each of the odd and even pixels are divided into the front and rear pixel groups, and thus the formed image seems to be different in the image density in the front and rear portions of the image, and thus the image density difference is clearly seen. In order to solve this problem, the offset voltage correction by a staggered arrangement of a plurality of CCDs such as in the adhesion type sensor can be applied. According to this correction method, however, a gradation (gray chart) correction needs to be performed in addition to the conventional white and black shading corrections, and thus the algorithm of the correction operation becomes so complicated.

BRIEF SUMMARY OF THE INVENTION

The object of the present invention is to provide a correction device and a correction method which facilitate the correction of the difference in image density in the read image, and an image reading device, and image forming apparatus capable of improving the quality and the reliability of the read image.

The object of the present invention is attained by an image density correction device of the first aspect of the present invention, comprising: a photoelectric conversion element having first and second blocks, for photoelectrically converting received light; first means for obtaining an absolute value of an amplitude of an output signal output from the first block of the photoelectric conversion element; second means for comparing the absolute value with a predetermined reference value to obtain a difference thereof; first correction means for correcting the output signal on the basis of the difference obtained by the second means; and second correction means for correcting an output signal output from the second block on the basis of the difference obtained by the second means.

The object of the present invention is also attained by an image density correction method of the second aspect of the present invention, by which an output signal of a photoelectric conversion element receiving reflection light from an irradiated document is corrected, wherein the output signal of the photoelectric conversion element is divided into an image signal and a control signal, an amplitude voltage of the output signal is detected from the obtained control signal, an absolute value of an amplitude of the output signal is detected on the basis of the detected amplitude voltage, the obtained absolute value is compared with a predetermined reference value to obtain an error signal voltage, the obtained error signal voltage is held, the held voltage is converted into an electric current, and the image signal divided from the output signal of the photoelectric conversion element is corrected to have a predetermined voltage with use of the electric current converted from the held voltage.

The object of the present invention is also attained by an image reading device of the third aspect of the present invention, which irradiates a document and reads an image of the document with use of a photoelectric conversion element having first and second blocks and photoelectrically converting received light reflected from the document by correcting an output signal from the photoelectric conversion element, comprising: first means for obtaining an absolute value of an amplitude of an output signal output from the first block of the photoelectric conversion element; second means for comparing the absolute value with a predetermined reference value to obtain a difference thereof; first correction means for correcting the output signal on the basis of the difference obtained by the second means; second correction means for correcting an output signal output from the second block on the basis of the difference obtained by the second means; transfer means for transferring the output signal corrected by the first correction means and the output signal corrected by the second correction means, by which a pixel arrangements in the output signals are corrected to original one; and processing means for processing the output signals which are transferred from the transfer means and have the original pixel arrangement.

The object of the present invention is also attained by an image reading device of the fourth aspect of the present invention, which irradiates a document and reads an image of the document with use of a quadruplex photoelectric conversion element for dividing image data into four groups and photoelectrically converting received light reflected from the document by correcting first, second, third, and fourth output signals from the qudruplex photoelectric conversion element, comprising: first correction means for dividing the first output signal output from the quadruplex photoelectric conversion element into an image signal and a control signal, comparing an absolute value of the control signal with a predetermined reference value, and correcting the divided image signal to have a predetermined voltage with use of an error signal obtained by the comparison; second correction means for dividing the second output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as a reference value from the first correction means; third correction means for dividing the third output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means; fourth correction means for dividing the fourth output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means; transfer means for transferring the image signal corrected by the first correction means, the image signal corrected by the second correction means, the image signal corrected by the third correction means, and the image signal corrected by the fourth correction means by which a pixel arrangements of the image signals are corrected to an original one; and processing means for processing the output signals which are transferred from the transfer means and have the original pixel arrangement.

The object of the present invention is also attained by an image forming apparatus of the fifth aspect of the present invention, which irradiates a document and forms an image of the document on the basis of an corrected signal output from a photoelectric conversion element having first and second blocks and photoelectrically converting received reflected light from the document, comprising: first means for obtaining an absolute value of an amplitude of an output signal output from the first block of the photoelectric conversion element; second means for comparing the absolute value with a predetermined reference value to obtain a difference thereof; first correction means for correcting the output signal on the basis of the difference obtained by the second means; second correction means for correcting an output signal output from the second block on the basis of the difference obtained by the second means; transfer means for transferring the output signal corrected by the first correction means and the output signal corrected by the second correction means, by which a pixel arrangements in the output signals are corrected to original one; processing means for processing the output signals which are transferred from the transfer means and have the original pixel arrangement; and image forming means for forming the image on the basis of the output signal processed by the processing means.

The object of the present invention is also attained by an image forming apparatus of the sixth aspect of the present invention, which irradiates a document and forms an image on the basis of corrected first, second, third, and fourth output signals from a quadruplex photoelectric conversion element dividing image data into four groups and photoelectrically converting received light reflected from the document, comprising: first correction means for dividing the first output signal output from the quadruplex photoelectric conversion element into an image signal and a control signal, comparing an absolute value of the control signal with a predetermined reference value, and correcting the image signal to have a predetermined voltage with use of an error signal obtained by the comparison; second correction means for dividing the second output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as a reference value from the first correction means; third correction means for dividing the third output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means; fourth correction means for dividing the fourth output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means; transfer means for transferring the image signal corrected by the first correction means, the image signal corrected by the second correction means, the image signal corrected by the third correction means, and the image signal corrected by the fourth correction means by which a pixel arrangements in the output signals are corrected to an original one; processing means for processing the output signals transferred from the transfer means and have the original pixel arrangement; and image forming means for forming the image on the basis of the output signal processed by the processing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a detailed view showing the circuit constitution of the quadruplex CCD circuit of the CCD;

FIG. 5A is a view for explaining the output pixels of the quadruplex CCD;

FIG. 5B is a view for explaining the output pixels of the quadruplex CCD;

FIG. 5C is a view for explaining the output pixels of the quadruplex CCD;

FIG. 5D is a view for explaining the output pixels of the quadruplex CCD;

FIG. 5E is a view for explaining the output pixels of from the quadruplex CCD;

FIG. 6A is a view for explaining the pixels stored in a buffer;

FIG. 6B is a view for explaining the pixels stored in a buffer;

FIG. 6C is a view for explaining the pixels stored in a buffer;

FIG. 6D is a view for explaining the pixels stored in a buffer;

FIG. 6E is a view for explaining the pixels stored in a buffer;

FIG. 7A is a view for explaining the pixels stored in a transfer data memory buffer;

FIG. 7B is a view for explaining the pixels stored in the transfer data memory buffer;

DETAILED DESCRIPTION OF THE INVENTION

An embodiment of the present invention will be described below with reference to the drawings.

The following is the embodiment of a composite type image forming apparatus having three functions of a copying machine (PPC), a facsimile machine (FAX), and a printer (PRT).

Figure 1:
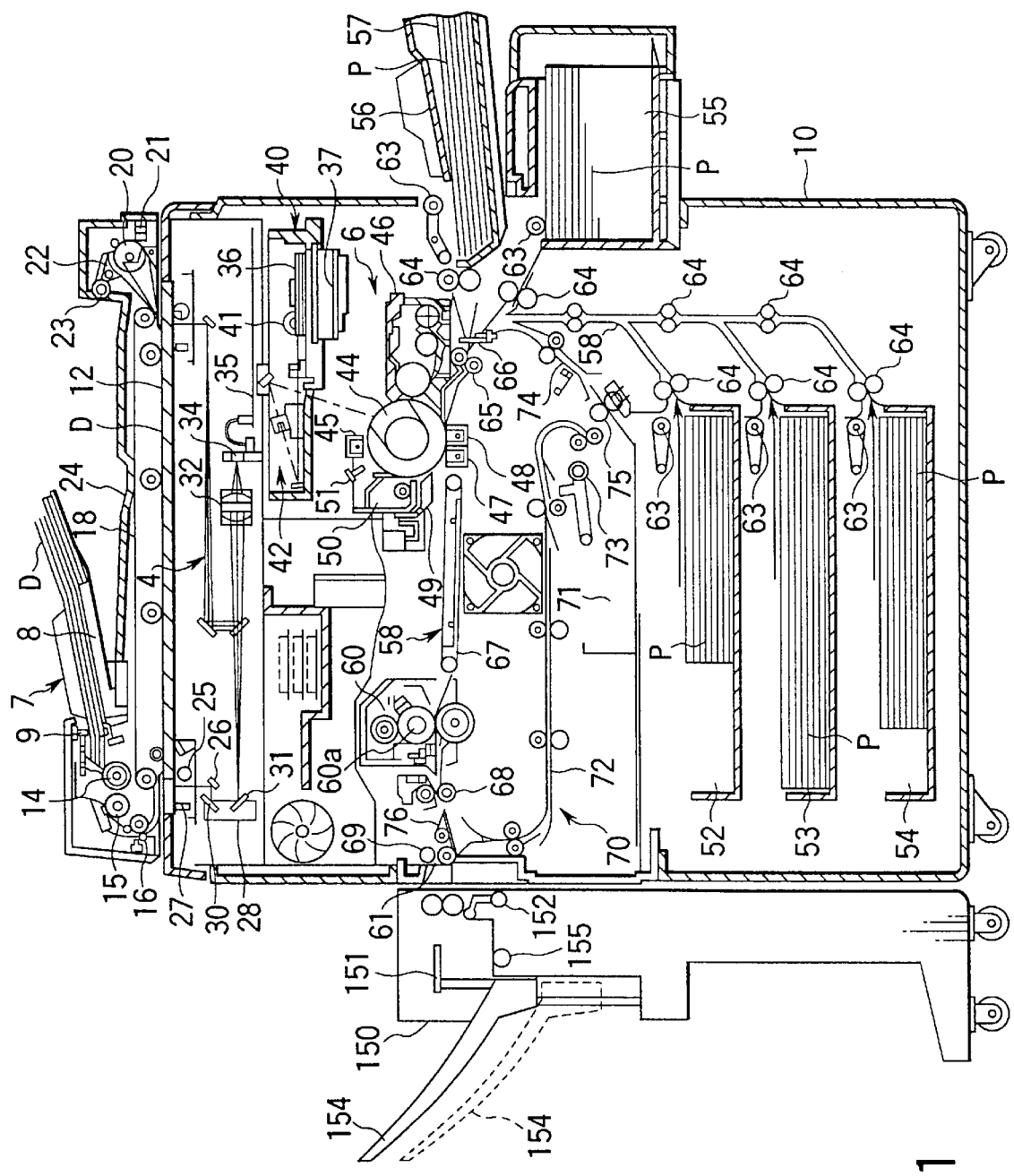
FIG. 1 is a schematic view illustrating a digital copying machine according to the present invention.

FIG. 1 is a view showing an inner structure of a digital copying machine as one example of the present invention.

As shown in FIG. 1, the digital copying machine has a machine body 10 which is provided with a scanner section 4 functioning as image reading means described later and a printer section 6 functioning as image forming means.

On the upper face of the machine body 10, a document mount 12 having a transparent glass plate for mounting thereon an object to be read, i.e., the document D, is provided. The upper face of the machine body 10 is also provided with an automatic document feeder (hereinafter referred to as "ADF") 7 for automatically feeding the document to the document mount 12. The ADF 7 is arranged to be opened/closed with respect to the document mount 12, and also functions as a weight for keeping the document D from lifting off the document mount 12.

The ADF 7 comprises an document tray 8, an emptiness sensor 9 for sensing the presence/absence of the document, a pick-up roller 14 for picking the document up one by one, a feeding roller 15 for conveying the document picked by the pick-up roller 14, an aligning roller pair 16 for aligning the distal end of the document, and a conveyer belt 18 arranged to cover substantially the entire portion of the document mount 12. A plurality of document sheets turning their document faces upward on the document tray 8 are picked up one by one from the lowest page, i.e., the last page. After the distal end portion of the sheet is aligned by the aligning roller pair 16, the sheet is conveyed by the conveyer belt 18 to a predetermined position on the document mount 12.

In the ADF 7, the aligning roller pair 16 faces an overturning roller 20, non-overturned sheet sensor 21, a flapper 22, and a discharge roller 23, which are arranged at the end of the opposite side to that of the aligning roller pair 16 so as to arrange the conveyer belt 18 therebetween. The document D from which image information is read by the scanner section 4 described later is transferred from the document mount 12 by the conveyer belt 18, and discharged to a discharge section 24 on the upper surface of the ADF 7 via the overturning roller 20, the non-overturned sheet sensor 21, and the flapper 22. When the rear face of the document D needs to be read, the document D transferred by the conveyer belt 18 is overturned by the overturning roller 20, and then transferred to a predetermined position of the document mount 12 again through the conveyer belt 18 by the switched flapper 22.

The scanner section 4 arranged in the machine body 10 has an exposing lamp 25 as a light source for irradiating the document D mounted on the document mount 12 and a first mirror 26 for deflecting the light reflected by the document D in a predetermined direction. The exposing lamp 25 and the first mirror 26 are attached to a first carriage 27 arranged on a lower surface of the document mount 12.

The first carriage 27 is arranged movably in parallel to the document mount 12, and is reciprocated below the document mount 12 by a driving motor with use of a gear belt (not shown) or the like.

The lower surface of the document mount 12 is also provided with a second carriage 28 capable of moving in parallel to the document mount 12. The second carriage 28 is provided with second and third mirrors 30 and 31 for deflecting the reflection light from the document D which is deflected by the first mirror 26, in order. The second and third mirrors 30 and 31 are attached to the second carriage 28 so as to form a right angle with each other. The second carriage 28 is moved together with the first carriage 27 by the gear belt which drives the first carriage 27, and is moved at a speed of a half of that of the first carriage 27 in parallel with the first carriage 27 along the document mount 12.

Below the document mount 12, an image forming lens 32 for converging the reflection light from a third mirror 31 which is attached to the second carriage 28 and the quadruplex CCD (photoelectric conversion element) 34 for receiving the converged reflection light to convert the reflected light into electric charge are arranged. The image forming lens 32 is arranged on a plane including the light axis of the light deflected by the third mirror 31, so as to be movable by a driving mechanism. The image forming lens 32 moves itself to form an image from the reflection light with a desired magnification. The quadruplex CCD 34 converts the received reflection light into electric charge so as to output an electric signal corresponding to the image of the document D. The output signal of the CCD is input into an image processing circuit 35 which is incorporated into a printed board, through a quadruplex CCD circuit described later.

The printer section 6 as another main section of the apparatus is provided with a laser exposing apparatus 40 functioning as an electrostatic image forming means. The laser exposing device 40 comprises a semiconductor laser device 41 as a light source; a polygon mirror 36 as a scanning member for successively deflecting the laser beam emitted by the semiconductor laser device 41; a polygon motor 37 as a scanning motor for driving the polygon mirror 36 by rotating the polygon mirror 36 at a predetermined rotation rate; and an optical system 42 for guiding laser beam traveling from the semiconductor laser device 41 to a photosensitive drum 44 through the polygon mirror by deflecting the laser beam. The laser exposing apparatus 40 having such a structure is fixedly supported by a supporting frame (not shown) of the machine body 10.

The semiconductor laser device 41 is turned on/off in accordance with the image information read from the document D by the scanner 4 or the document information transmitted from a facsimile apparatus. The laser beam emitted from the semiconductor laser device 41 is directed to the photosensitive drum 44 via the polygon mirror 36 and the optical system 42, and scans the circumferential surface of the photosensitive drum 44 to form an electrostatic image on the circumferential surface of the photosensitive drum 44.

The printer section 6 has a rotatable photosensitive drum 44 as an image holder which is arranged in a substantially central portion of the machine body 10. The photosensitive drum 44 is exposed on the circumferential surface to the laser beam from the laser exposing apparatus 40, to form a predetermined electrostatic image thereon. The photosensitive drum 44 is surrounded by the following components arranged as if they were an integral device: a charger 45 for electrostatically charging the circumferential surface of the drum at a predetermined level; a developer 46 for supplying toner as developing agent to the electrostatic image formed on the circumferential surface of the photosensitive drum 44 in order to develop the image with desired image density; and a peeling charger 47 for peeling an object which is fed from the paper feeding cassette described later and on which the toner image formed on the photosensing drum, i.e., the copy sheet P, off the circumferential surface of the photosensitive drum 44. The following components also surround the photosensitive drum 44: a transfer charger 48 for transferring the toner image formed on the circumferential surface of the photosensitive drum 44 to the sheet P; a peeling craw 49 for peeling the copying sheet P off the circumferential surface of the photosensitive drum 44; cleaning device for cleaning the residual toner from the circumferential surface of the photosensitive drum 44; and a discharger 51 for discharging the circumferential surface of the photosensitive drum 44.

The machine body 10 is provided at its lower portion with an upper paper cassette 52, a middle paper cassette 53, and a lower paper cassette 54, each of which can be pulled out from the machine body 10, are arranged to be stacked on each other. These cassettes contain copy sheets different from each other in size. Near these cassettes, a large capacity paper feeder 55 having a capacity of containing three thousands of copy sheets of a size frequently used, e.g. A4 size is arranged. Above the large capacity paper feeder 55, a feeding cassette 57 also functioning as a manual feed tray 56 is detachably arranged.

In the machine body 10, a sheet conveying path 58 is formed to extend from each of the cassettes and large capacity paper feeder 55 to the end thereof with a fixing device 60 having a fixing lamp 60a through a transfer section positioned between the photosensitive drum 44 and the transfer charger 48. The machine body sidewall facing the fixing device 60 is provided with an output port 61 attached to a finisher 150 having a single tray.

Each of the upper paper cassette 52, the middle paper cassette 53, the lower paper cassette 54, the feeding cassettes 57, and the large capacity paper feeder 55 is provided at the neighborhood thereof with a pick-up roller 63 for picking a copy sheet P from the cassette or the feeder one by one. In order to convey the picked copy sheets through the conveying path 58, the conveying path 58 is provided with a plurality of feeding roller pairs 64.

The conveying path 58 is further provided therein with a resist roller pair 65 in the upper stream of the photosensitive drum 44. The resist roller pair 65 corrects the skew of the picked copy sheet P,.aligns the distal end of the copy sheet P with the distal end of the toner image on the photosensitive drum 44, and feeds the copy sheet P to the transfer section at the same speed as the rotating speed of the photosensitive drum 44. In front of the resist roller pair 65, i.e., in front of the feeding roller pairs 64, an prealigning sensor 66 for sensing the arrival of the copy sheet P is arranged.

The copy sheet P picked up from one of the cassettes or the feeder 55 by the pick-up roller 63 is conveyed to the resist roller pair 65 by the feeding roller pairs 64. After aligning the distal end of the copy sheet P with the distal end of the developed image, the copy sheet P is conveyed to the transfer section.

In the transfer section, the developed image, i.e., the toner image formed on the photosensitive drum 44 is transferred onto the copy sheet P by the transfer charger 48. The toner image transferred onto the copy sheet P is peeled off the circumferential surface of the photosensitive drum 44 by the peeling charger 47 and the craw 49, and conveyed to the fixing device 60 through a conveyer belt 67 as a part of the conveying path 52. After the fixing device 60 fuses the developing agent of the image to fix the developed image onto the copy sheet P, the copy sheet P is discharged onto the finisher 150 through the output port 61 by a feeding roller pair 68 and an output roller pair 69.

Below the conveying path 58, an automatic overturning device 70 is arranged to overturn the copy sheet P passing through the fixing device 60 and to feed the overturned copy sheet P to the resist roller pair 65 again. The automatic overturning device 70 comprises a temporary accumulating section 71 for temporarily accumulating the copy sheet P; an overturning path 72 as a branch of the conveying path 58, for overturning the copy sheet P passing through the fixing device 60 to guide to the temporary accumulating section 71; a pick-up roller 73 for picking the copy sheets P accumulated in the temporary accumulating section 71 up one by one; and a feeding roller 75 for feeding the picked copy sheet P to the resist roller pair 65 via a conveying path 74. At the branching portion of the conveying path 58 and the overturning path 72, a switching gate 76 is arranged for selectively providing the copying sheet P to either of the output port 61 and the overturning path 72.

In performing the both-sides copying operation, the copy sheet P is guided to the overturning path 72 by the providing gate 76. The overturned copy sheet P is accumulated in the temporary accumulating section 71 for a while, then conveyed to the resist roller pair 65 through the conveying path 74 by the pick-up roller 73 and the feeding roller pair 75. After the skew-correction and the alignment by the resist roller pair 65, the copy sheet P is conveyed to the transfer section again such that toner image is transferred onto the rear face of the copy sheet P. Thereafter, the copy sheet P travels through the conveying path 58, the fixing device 60, and the output roller 69, and then is output to the finisher 150.

The finisher 150 is designed to collect the output copy sheets in a predetermined unit, hold them with a staple, and accumulate therein. Every time when one sheet to be held by a staple together with the other sheets output from the output port 61, a guide bar 151 pushes the output sheet to the position at which the sheets are held with a staple. When all the sheets to be held as a unit are output, a paper weight arm 152 fixes the unit of the output sheets, and a stapler unit (not shown) holds the unit of sheets with a staple. Subsequently, the guide bar 151 descends in order to output the stapled unit of sheets to a finisher output tray 154 by a finisher output roller 155. The descending depth of the finisher output tray 154 is determined to some extent by the number of the output sheets. The finisher output tray 154 descends every time when one unit of document sheets is output. The guide bar 151 for aligning the output copy sheet P is positioned at a level not to contact the unit of sheets which has been stapled and output to the finisher output tray 154.

The finisher output tray 154 is connected to a shifting mechanism (not shown) for shifting the output place of the copy sheet one by one (in front, rear, left, and right directions, for example) for every outputting, in a sorting mode.

The machine body 10 is further provided in the front thereof at the upper portion with an operation panel (not shown) with use of which the user inputs instructions for various copying conditions and a copying operation starting signal for starting the copying operation.

Figure 2:
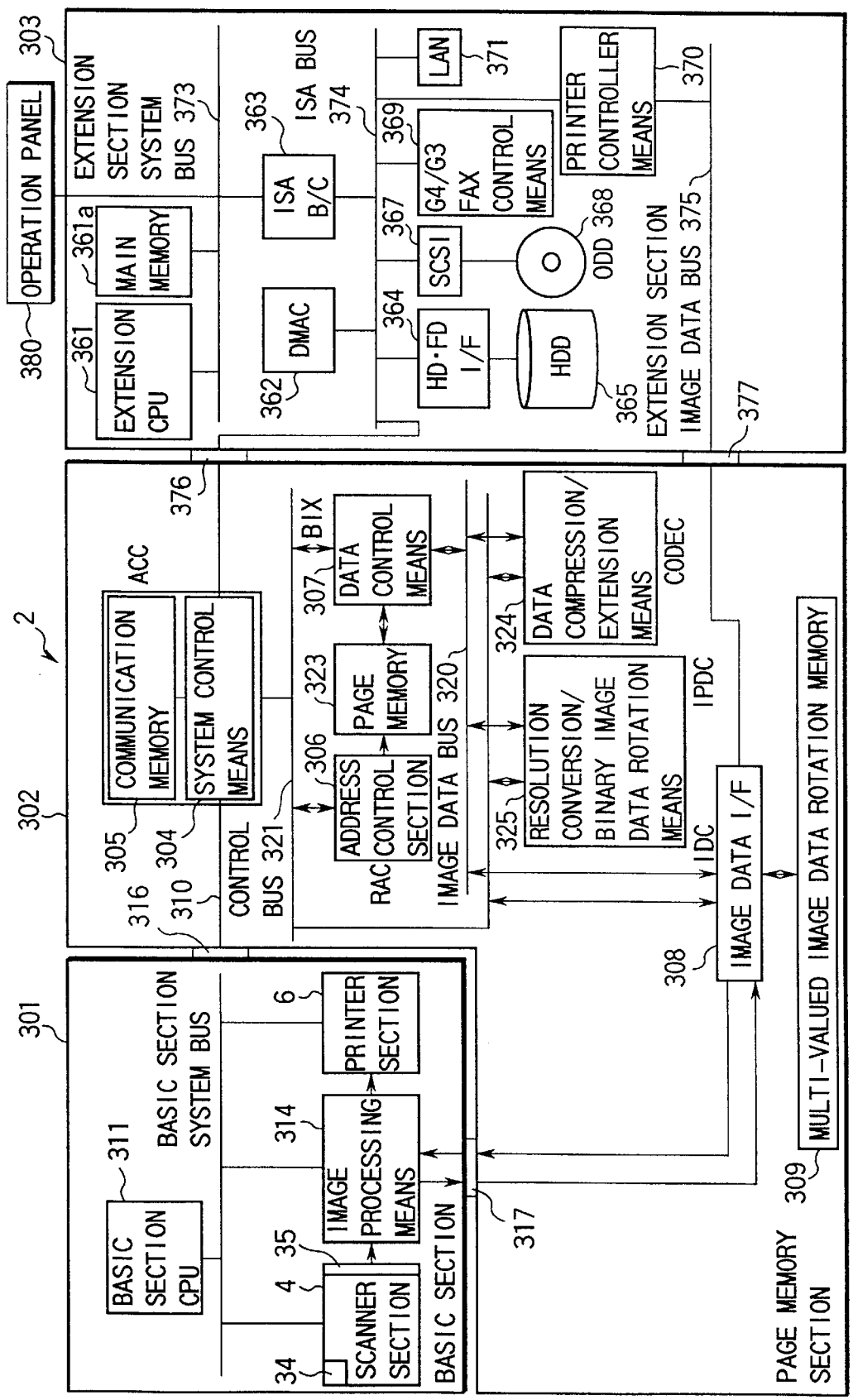
FIG. 2 is a block diagram showing a control system of the digital copying machine shown in FIG. 2.

Next, a control system of the digital copying machine having the above-mentioned structure will be described below with reference to FIG. 2.

The control system of the digital copying machine comprises three main sections: a basic section 301 as a main block of the digital copying machine, which has image processing means 314 connecting the scanner section 4 and the printer section 6; a page memory section 302 for realizing memory copy (electric sorting) operation by recording the image data received from the basic section 301 and transferring it to the basic section 301 again; and an extension section 303 including a hard disk (HD) as a secondary memory for storing compressed image data transferred from the page memory section 302, a FAX board (G4/G3 FAX control means) 369 for transferring/receiving the compressed image data to/from the outside through the public telephone line; a LAN board (local area network control means) 371 for transferring/receiving the compressed image data to/from the other section in the same locality through the LAN line; a mother board having an extension section CPU 361 for controlling the FAX board and the LAN board through a system bus 373 and an ISA bus 374, a main memory 361a used by the extension section CPU 361, and a DMAC 362 for controlling the DMA transfer through the ISA bus 374.

The basic section 301 and the page memory section 302 are connected by a basic section system interface 316 through which control data is transferred and a basic section image interface 317 through which image data is transferred. The page memory section 302 and the extension section 303 are connected by an extension section system interface 376 through which control data is transferred and an extension section image interface 377 through which image data is transferred.

The inner structure of the above three main sections will be described below with reference to FIG. 2.

The basic section 301 comprises input means (the scanner section) 4; output means (the printer section) 6; image processing means 314; and control means (the basic section CPU) 311 for controlling them.

The scanner section 4 has a quadruplex CCD 34 comprising a plurality (one line) of photoconductive elements arranged in a line, and reads the image of the document mounted on the document mount 12 in unit of a line in accordance with the instruction from the basic section CPU 311. The scanner section 4 converts the image density of the image into the digital data of 8 bits, and outputs the converted data as time series digital data together with a synchronizing signal to the image processing means 314 through a scanner interface (not shown).

The basic section CPU 311 controls each components of the basic section 301 and each components of the page memory section 302.

The page memory section 302 as the other one of the main sections of the control system comprises: system control means 304 incorporating therein a communication memory 305, and for controlling the transfer of the control data between the basic section CPU 311 in the basic section 301 and the extension section CPU 361 in the extension section 303 and for controlling an access from the basic section 301 and the extension section 303 to the page memory 323; storing means (a page memory) for temporarily storing image data; an address controlling section for generating addresses of the page memory 323; an image data bus 320 through which image data is transferred among the devices in the page memory section 302; a control bus through which a control signal is transferred between the devices in the page memory section 302 and the system controlling means 304; data control means 307 for controlling data transfer between the page memory 323 and the other device through the image data bus 320; image data I/F means 308 for interfacing the basic section 301 and the basic image interface 317 when the image data is transferred therethrough; resolution conversion/binary image data rotation means for converting the resolution of the image data into the resolution of the other machine when the image data is transferred to the other machine having different resolution from that of the machine of the present invention, for converting the resolution of the image data received from the other machine having different resolution into the resolution of the printer section 6 of the basic section 301, and for executing 90° rotation processing of the binary image data; data compression/extension means 324 for compressing the input image data to transfer the image data by the apparatus such as a FAX which transfers data after compressing the data or to store the data in a device such as an optical disk, which stores data after compressing the data, and for extending the compressed image data to visualize the image data with use of the printer section 6; and a multi-valued data rotation memory 309 connected to the image data I/F means 308 and used to rotate the image data output from the printer section 6 by 90° or −90°.

The extension section 303 as the other one of the mains sections of the control system comprises: control means (the extension section CPU) for controlling the devices in the extension section 303 through the extension system bus 373, a main memory 361a used by the extension CPU 361; an ISA bus 374 for a general use; a ISA bus controller (ISA·B/C) 363 for interfacing an extension system bus 373 and the ISA bus 374; a DMA (DMAC) controller 362 for controlling the data transfer through the ISA bus 374; storing means (HDD) 365 connected to the ISA bus 374, for electrically storing image data; an HD·FD interface (HD·FD I/F) 364 as an interface between the storing means 365 and the ISA bus 374; storing means (the optical disk: ODD) 368 connected to the ISA bus 374, for electrically storing the image data; an SCSI interface 367 as an interface between the storing means 368 and the ISA bus 374; local area (LAN) network control means 371 for attaining the LAN function; printer controller means 370 for attaining the printer function; G4/G3 FAX control means 369 having the G4/G3 FAX control function; and an extension image bus 375 for outputting the image data output from the printer controller means 370 to the page memory section 302 through the system image interface 377.

A hard disk HD contained in the HDD 365 stores as a file compressed image data of every document comprising one or a plurality of pages so as to be retrieved by corresponding retrieval data.

The extension system bus 373 is connected to the operation panel comprising a keyboard from which an instruction to the extension section 303 is input, and a display.

The storing means (ODD) 368 is connected to the ISA bus 374 through the SCSI interface 367, and the extension section CPU 361 controls the storing means 368 through the extension system bus 373, the ISA·B/C 363, and the ISA bus 374 with use of SCSI command.

Next, the image data I/F means (the image data control means) 308 will be described below. The image data I/F means 308 performs the image data transfer between the scanner section 4 or the printer section 6 and the page memory 323 through the image data processing means 314. The image data I/F means 308 performs the image data transfer between the printer controller 370 or the like connected to the extension image bus 375 and the page memory 323.

The page memory 323 in the page memory section 302 used in this embodiment has a large memory capacity.

Figure 3:
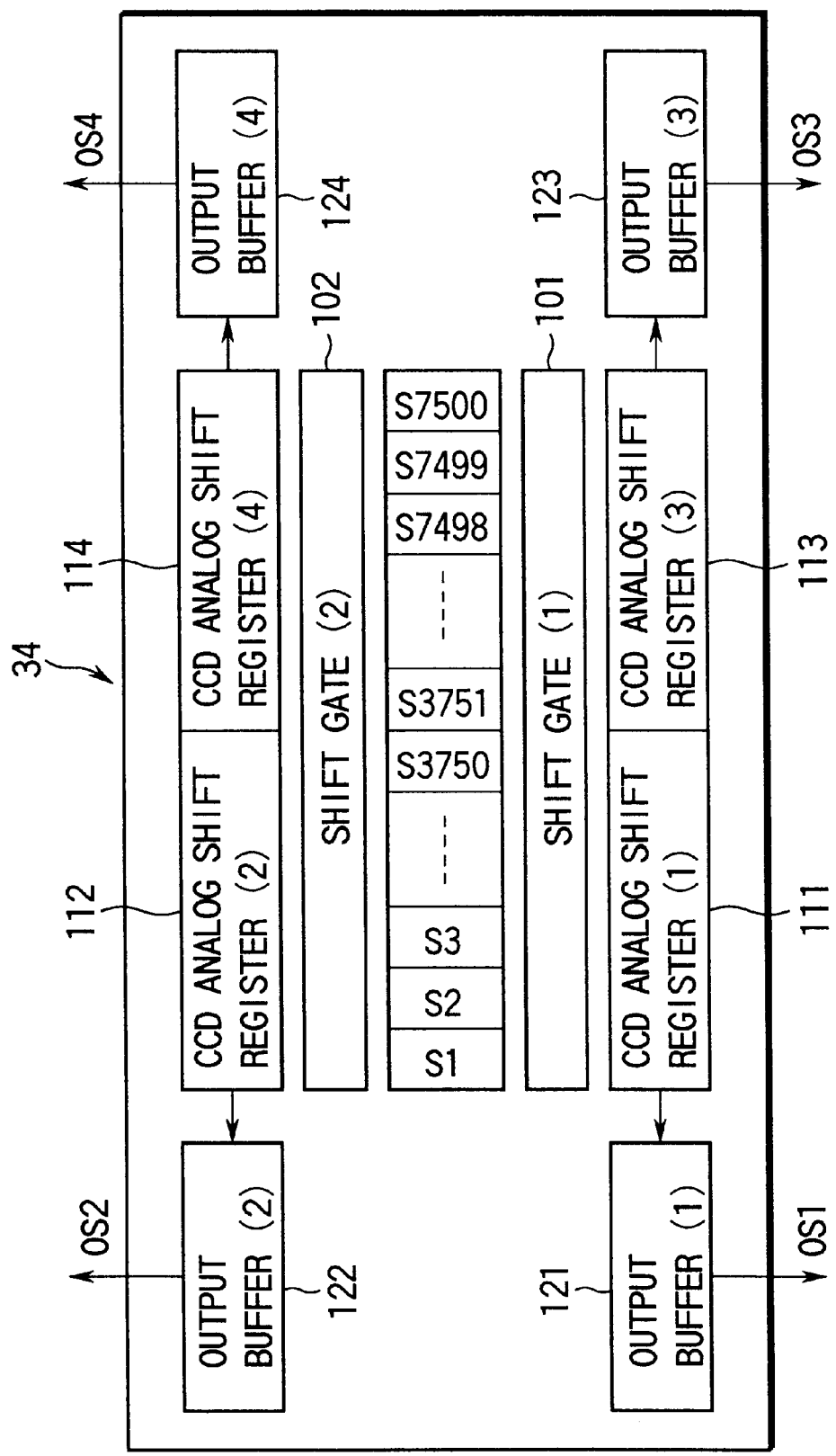
FIG. 3 is a detailed block diagram showing the constitution of a quadruplex CCD provided to the digital copying machine, which divides image data into four pixel groups.

FIG. 3 shows the structure of the quadruplex CCD 34, in detail. The quadruplex CCD 34 comprises: photo diodes S1–S7500; a shift gate 101; a shift gate 102; CCD analog shift registers 111–114; output buffer memories 121–124; and output terminal OS1–OS4.

The photo diodes S1–S7500 photoelectrically converts light reflected by the document into an electric signal. The shift gates 101–102 transfer the image signals converted by the photo diodes S1–S7500 to the CCD analog shift registers 111–114 at the timing controlled by the image processing circuit 35.

The CCD analog shift registers 111–114 are the transfer circuits for transferring the image signals transferred through the shift gates 101 and 102 to the image processing circuit 35. The CCD analog shift registers 111 and 112 transfer the image data through odd pixels and even pixels of the photo diodes S1–S3750 (at the front side: denoted in the drawing as "Odd sensor 1" and "Even sensor 1"), and the CCD analog shift registers 113 and 114 transfer the image data through odd pixels and even pixels of the photo diodes S3751–S7500 (at the rear side: denoted in the drawing as "Odd sensor 2" and "Even sensor 2").

The output buffer memories 121–124 output to the outside the image signals which are serially transferred from the CCD analog shift registers 111–114 and have as sufficient impedance.

FIG. 4 shows the structure of a quadruplex CCD circuit 100 for performing the transfer of the image data obtained by the quadruplex CCD 34. The quadruplex CCD circuit 100 transfers the pixel data output from the quadruplex CCD 34 to be divided into four pixel groups, and outputs the pixel data to the image processing circuit 35 so as to recover the original CCD pixel arrangement.

The quadruplex CCD circuit 100 comprises: an AGC-M0 circuit 130; an analog-digital converter (ADC) 171; a memory buffer 181; an AGC-S1 circuit 140; an analog-digital converter (ADC) 172; a memory buffer 182; an AGC-S2 circuit 150; an analog-digital converter (ADC) 173; a memory buffer 183; an AGC-S3 circuit 160; an analog-digital converter (ADC) 174; a memory buffer 184; and a transfer data memory buffer 200.

The analog data transferred from the quadruplex CCD 34 preferably has a low frequency. The transfer clock frequency is thus set at 10 MHz when the data is transferred from the output terminal OS1 to the AGC-M0 circuit 130, the ADC 171, and the memory buffer 181. Similarly, the transfer clock frequency in the data transfers from the output terminal OS2 to the AGC-S1 circuit 140, the ADC 172, and the memory buffer 182, from the output terminal OS3 to the AGC-S2 circuit 150, the ADC 173, and the memory buffer 183, from the output terminal OS4 to the AGC-S3 circuit 160, the ADC 174, and the memory buffer 184, is also set at 10 MHz.

In contrast, in the data transfer from the memory buffers 181–184, i.e., digital data transfer, the transfer clock frequency is set at 40 MHz.

The above-mentioned quadruplex CCD 34 shown in FIG. 3 is a quadruplex CCD having 7500 pixels (i.e., the photo diodes S1–S7500) realizing a resolution of 600 dpi. Firstly, the quadruplex CCD divides the imaging region into first and second half portions, i.e., front and rear portions, by dividing all the pixels between the $3750^{th}$ and the $3751^{th}$ pixels in the main scanning direction, and then separating the odd pixels from the even pixels in the two divided pixel groups, respectively. By dividing the imaging region into four parts in such a manner, the CCD can be driven with use of the driving clock signal of a quarter of that for driving the CCD of the non-divided pixels.

A CCD is formed to output data from both end pixels aligned in a line the main scanning direction. The data of the pixels according to the present invention as shown in FIG. 5A is thus output from the output terminals OS1 and OS2 of the CCD in such orders that the odd pixel and the even pixel at the first of all the pixels in the groups are output at the first of all the pixels of the groups in a count-up manner as shown in FIGS. 5B and 5C. From the output terminals OS3 and OS4 of the CCD, the odd pixel and the even pixel at the last of all the pixels are output at the first of all the pixels in the groups in a count-down manner as shown in FIGS. 5D and 5E.

With such output orders, the output signals of the quadruplex CCD need to be subjected to the time series conversion, thereafter. Accordingly, the quadruplex CCD circuit 100 shown in FIG. 4 performs the time series conversion for the output signals of the quadruplex CCD with use of the memory buffer 181–184 and the data transfer memory buffer 200, as described below more specifically.

As shown in FIG. 3, the output signal from the output terminal OS1 of the quadruplex CCD 34 is adjusted to have a suitable amplitude by the AGC-M0 circuit 130, and then converted from an analog signal into a digital signal by the analog-digital converter (ADC) 171 so as to be quantized. The quantized output signal is stored as digital data in the memory buffer 181, as shown in FIG. 6B.

The output signal from the output terminal OS2 of the quadruplex CCD 34 is adjusted to have a suitable amplitude by the AGC-S1 circuit 140, and then converted from an analog signal to a digital signal by the analog-digital converter (ADC) 172 so as to be quantized. The quantized output signal is stored as digital data in the memory buffer 182, as shown in FIG. 6C.

Similarly, the output signal from the output terminal OS3 of the quadruplex CCD is adjusted to have a suitable amplitude by the AGC-S2 circuit 150, and then converted from an analog signal to a digital signal by the analog-digital converter (ADC) 173 so as to be quantized. The quantized output signal is stored as digital data in the memory buffer 183, as shown in FIG. 6D.

In the similar manner as mentioned above about the other output terminals, the output signal from the output terminal OS4 of the quadruplex CCD is also adjusted to have a suitable amplitude by the AGC-S3 circuit 160, and converted from an analog signal to a digital signal by the analog-digital converter (ADC) 174 so as to be quantized. The quantized output signal is stored as digital data in the memory buffer 184, as shown in FIG. 6E.

The outputs of the quadruplex CCD are serial in the time series. Therefore, the pixel arrangement of the quadruplex CCD 34 in outputting the signals is maintained till the output signals are stored in the memory buffers 181–184, as shown in FIGS. 5A, 5B, 5C, 5D, and 5E and 6A, 6B, 6C, 6D, and 6E.

When the output signals are transferred to the transfer data memory buffer 200, the outputs of the quadruplex CCD 34 are set free from the binding of the time series, as shown in FIGS. 7A and 7B, and are stored in the transfer data memory buffer 200 in the original order, i.e., from the first pixel S1 to the last pixel S7500. The original pixel arrangement of the quadruplex CCD 34 is recovered in the transfer data memory buffer 200.

Each data stored in the memory buffers 181–184 necessarily corresponds to the data of corresponding one of the pixels in the quadruplex CCD 34, and thus the transfer pattern in transferring the data to recover the pixels arrangement order is also automatically determined.

In this manner, the image processing as performed in the conventional apparatus can be performed in the image processing circuit 35.

Figure 8:
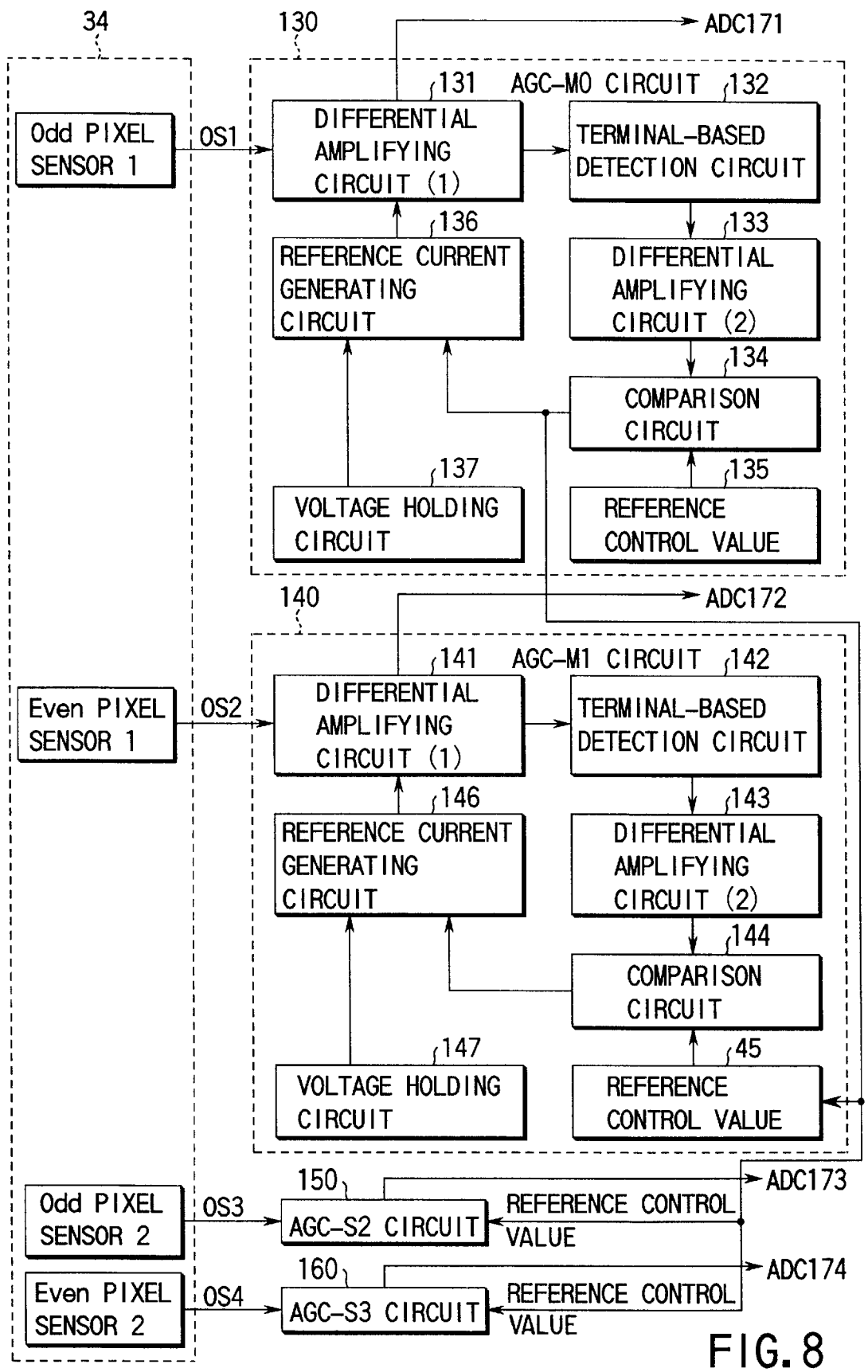
FIG. 8 is a view showing the constitution of the offset voltage AGC circuits.

FIG. 8 shows the constitution of the offset voltage AGC circuit. The offset voltage AGC circuit of the present invention comprises the AGC-M0 circuit 130, the AGC-S1 circuit 140, the AGC-S2 circuit 150, and the AGC-S3 circuit 160, as described above.

The AGC-M0 circuit 130 includes a differential amplifying circuit 131, a terminal-based detection circuit 132, a differential amplifying circuit 133, a comparison circuit 134, a reference control value 135, a reference current generating circuit 136, and a voltage holding circuit 137.

The differential amplifying circuit 131 performs the differential amplification of the image signal transferred from the output terminal OS1 of the CCD sensor 34 to divide the signal into the signal to be transferred to the image processing circuit 35 and an AGC detection signal. The terminal-based detection circuit 132 performs the envelop detection of the signal output from the differential amplifying circuit 131 at both end terminals of the terminal-based detection circuit. The differential amplifying circuit 133 compares the signal output from the both end terminals of the terminal-based detection circuit 132 in order to obtain the absolute value of the CCD output signal.

The comparison circuit 134 compares the detected CCD input signal absolute value obtained by the differential amplifying circuit 133 with the reference control value 135, and outputs the difference thereof as a reference control value of the voltage holding circuit 137 and AGC-S1 AGC-S1 circuit 140, AGC-S2 circuit 150, and AGC-S3 circuit 160. The voltage holding circuit 137 holds the difference voltage obtained by the comparison circuit 134 at timing of the shading correction. The reference current generating circuit 136 makes an electric current having a predetermined value flow into the differential amplifying circuit 131 in accordance with the voltage held by the voltage holding circuit 137.

The AGC-S1 circuit 140 includes a differential amplifying circuit 141, a terminal-based detection circuit 142, a differential amplifying circuit 143, a comparison circuit 144, a reference control value 145, a reference current generating circuit 146, and a voltage holding circuit 147.

The differential amplifying circuit 141 performs the differential amplification of the image signal transferred from the output terminal OS1 of the CCD sensor 34 to divide the signal into the signal to be transferred to the image processing circuit 35 and an AGC detection signal detected by the AGC. The terminal-based detection circuit 142 performs the envelop detection of the signal output from the differential amplifying circuit 141 at both end terminals of the terminal-based detection circuit. The differential amplifying circuit 143 compares the signals output from the both end terminals of the terminal-based detection circuit 142 in order to obtain the absolute value of the CCD output signal.

The comparison circuit 144 compares the detected CCD output signal absolute value obtained by the differential amplifying circuit 143 with the difference obtained by the comparison circuit 134 of the AGC-M0 circuit 130, i.e., the reference control value 145, and outputs the difference to the reference current generating circuit 146. The voltage holding circuit 147 holds the difference voltage obtained by the comparison circuit 144 at timing of the shading correction. The reference current generating circuit 146 makes an electric current having a predetermined value flow into the differential amplifying circuit 141 in accordance with the voltage held by the voltage holding circuit 147.

The AGC-S2 circuit 150 and the AGC-S4 circuit 140 have the same constitution as that of the AGC-S1 circuit 140, and thus FIG. 4 does not show the detailed constitutions of the circuits 150 and 160, and the detailed description thereof is omitted here.

Figure 9:
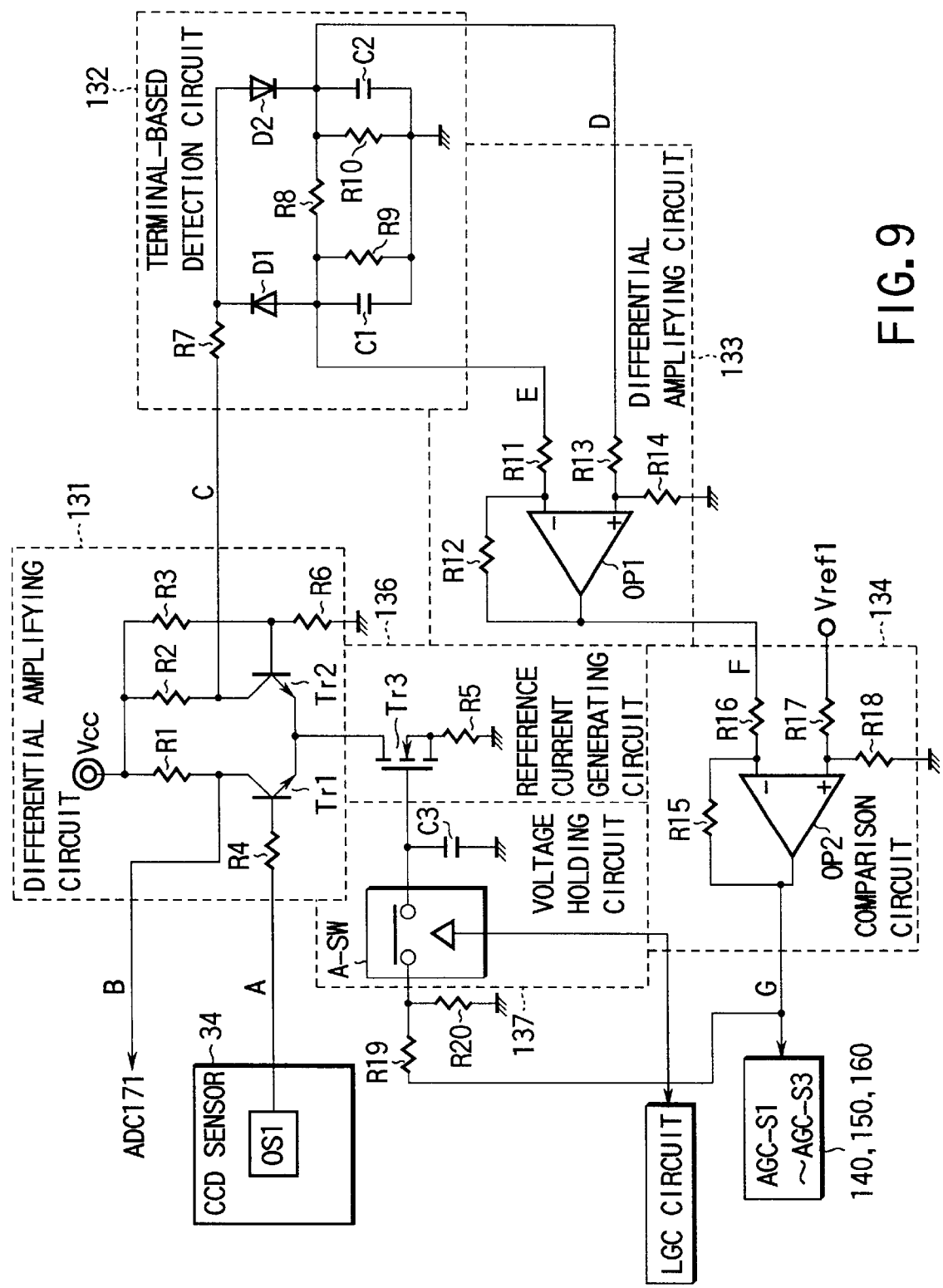
FIG. 9 is a detailed view showing the constitution of the offset voltage AGC-M0 circuit.

FIG. 9 is a detailed view showing the constitution of the AGC-M0 circuit 130.

The differential amplifying circuit 131 is the conventional differential amplifying circuit comprising transistors Tr1 and Tr2, and resistors R1, R2, R3, R4, and R6. The transistor Tr1 receives the image signal output from the output terminal OS1 of the CCD sensor 34 and constitutes the differential amplifying circuit together with the transistors Tr2. The resistors R3 and R6 constitute a bias voltage circuit for applying the transistors Tr2 with a bias voltage set at substantially the same level as that of the offset voltage of the CCD sensor 34. The resistor R5 constitutes a circuit for constantly generating the reference current having a predetermined value, and determines the value of the reference current. The resistors R1 and R2 determine the amplifying level of the differential amplifying circuit 131. The voltages at the both ends of the resistor R1 are set at the level necessary for inputting the image signal into the image processing circuit 35, and the voltages at the both ends of the resistor R2 are set at the level necessary for operating the offset voltage AGC circuit.

The terminal-based detection circuit 132 comprises an upstream terminal detection diode D2, a downstream terminal detection diode D1, an upstream terminal rectifying capacitor C2, an upstream terminal rectifying resistor R10, a downstream terminal rectifying capacitor C1, a downstream terminal rectifying resistor R9, and a both end terminal equilibrium resistor R8. The time constants of these elements are set at the values to smoothen the pixel signal.

The differential amplifying circuit 133 comprises an operation amplifier OPI and resistors R11, R12, R13, and R14, and operates to detect an absolute amplification value of the image signal is obtained by the terminal-based circuit 132.

The comparison circuit 134 comprises an operation amplifier OP2 and resistors R15, R16, R17, and R18, and operates to compare a reference control value $V_{ref1}$ and the absolute amplification value to output the difference thereof as a reference current control value and a reference control value $V_{ref2}$ of the AGC-S1 circuit 140, AGC-S2 circuit 150, and AGC-S3 circuit 160.

The voltage holding circuit 137 comprises an analog switch A-SW and a capacitor C3, and holds the difference voltage output from the comparison circuit 134 at the timing of the shading correction. The resistors R19 and R20 adjust the output voltage of the voltage holding circuit 137.

The reference current generating circuit 136 comprises a transistor (MOS FET) Tr3 and a source resistor R5, and generates a reference current of a predetermined value in accordance with the voltage held by the voltage holding circuit 137 and makes the current flow into the differential amplifying circuit 131.

Figure 10:
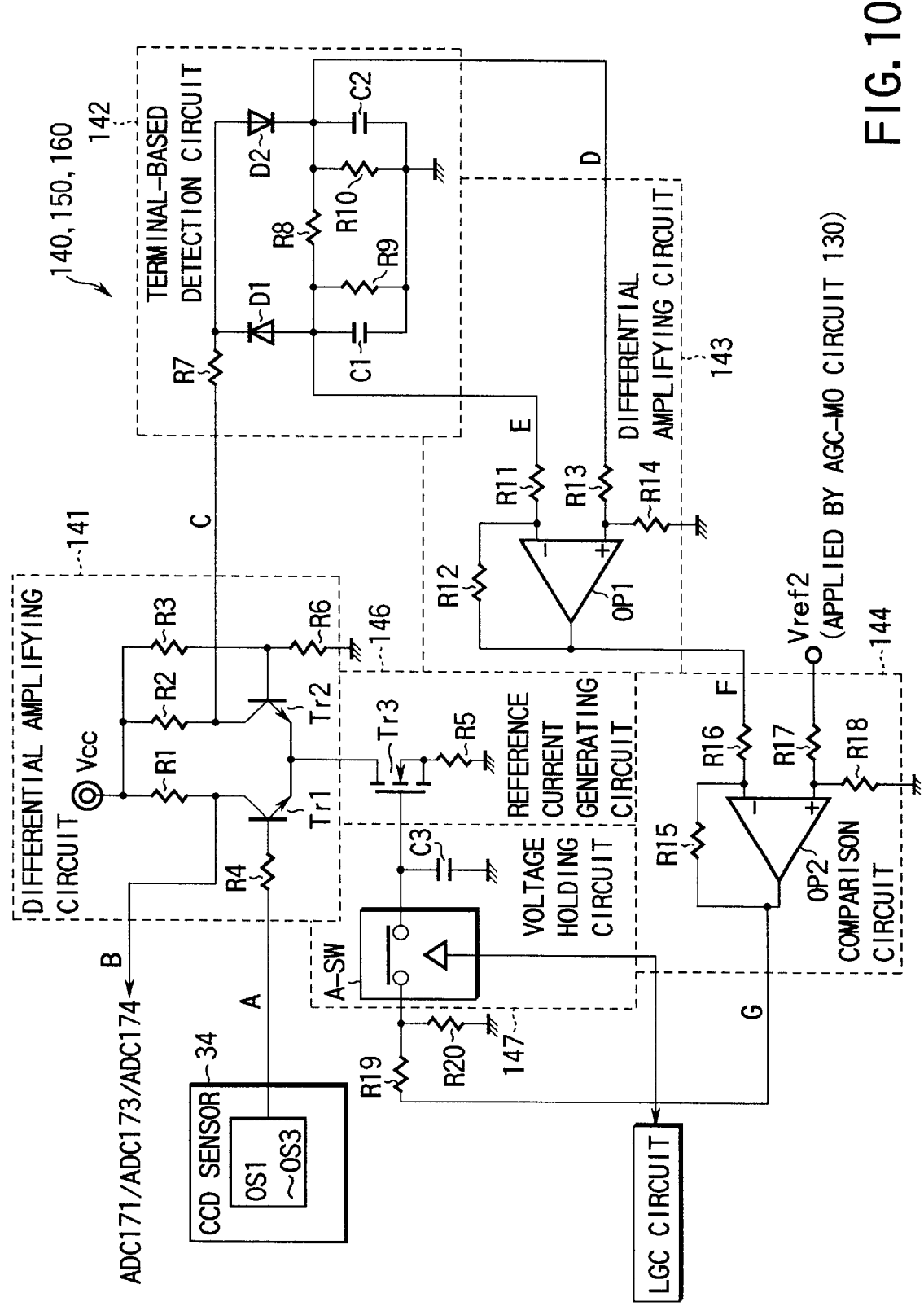
FIG. 10 is a detailed view showing the constitution of the offset voltage AGC-S1/AGC-S2/AGC-S3 circuit.

FIG. 10 is a detailed view showing the constitution of the offset voltage AGC-S1 circuit 140 (or AGC-S2 circuit 150, AGC-S3 circuit 160).

The differential amplifying circuit 141 is the. conventional differential amplifying circuit comprising transistors Tr1 and Tr2, and resistors R1, R2, R3, R4, and R6. The transistor Tr1 receives the image signal output from the output terminal OS2 of the CCD sensor 34 and constitutes the differential amplifying circuit together with the transistors Tr2. The resistors R3 and R6 constitute a bias voltage circuit for applying the transistors Tr2 with a bias voltage set at substantially the same level as that of the offset voltage of the CCD sensor 34. The resistor R5 constitutes a circuit for constantly generating the reference current having a predetermined value, and determines the value of the reference current. The resistors R1 and R2 determine the amplifying level of the differential amplifying circuit 141. The voltages at the both ends of the resistor R1 are set at the level necessary for inputting the image signal into the image processing circuit 35, and the voltages at the both ends of the resistor R22 are set at the level necessary for operating the offset voltage AGC circuit.

The terminal-based detection circuit 142 comprises an upstream terminal detection diode D2, a downstream terminal detection diode D1, an upstream terminal rectifying capacitor C2, an upstream terminal rectifying resistor R10, a downstream terminal rectifying capacitor C1, a downstream terminal rectifying resistor R9, and a both end terminal equilibrium resistor R8. The time constants of these elements are set at the values to smoothen the pixel signal.

The differential amplifying circuit 143 comprises an operation amplifier OP1 and resistors R11, R12, R13, and R14, and operates to detect an absolute amplification value of the image signal obtained by the terminal-based circuit 142.

The comparison circuit 144 comprises an operation amplifier OP2 and resistors R15, R16, R17, and R18, and operates to compare the reference control value $V_{ref2}$ input from the AGC-M0 circuit 130 and the absolute amplification value to output the difference thereof as a reference current control value to the voltage holding circuit 147.

The voltage holding circuit 147 comprises an analog switch A-SW and a capacitor C3, and holds the difference voltage output from the comparison circuit 144 at the timing of the shading correction. The resistors R19 and R20 adjust the output voltage of the voltage holding circuit 147.

The reference current generating circuit 146 comprises a transistor (MOS FET) Tr3 and a source resistor R5, and generates a reference current of a predetermined value in accordance with the voltage held by the voltage holding circuit 147 and makes the current flow into the differential amplifying circuit 141.

FIGS. 11A, 11B, 11C, 11D, 11E, and 11F are timing charts showing waveforms of signals in the offset voltage AGC circuits.

Figure 11A:
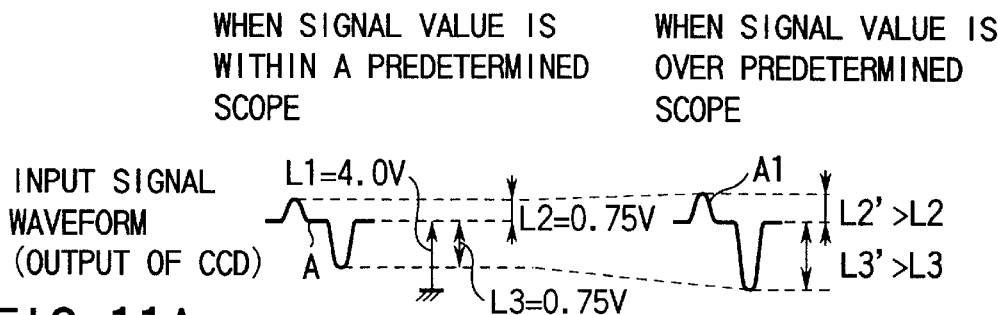
FIGS. 11A, 11B, 11C, 11D, 11E, and 11F are timing charts showing waveforms of signals of the offset AGC circuit.

The input signal waveform A shown in FIG. 11A is the waveform of the output signal of the quadruplex CCD 34, and the waveform of the base voltage of the transistor Tr1.

Figure 11B:
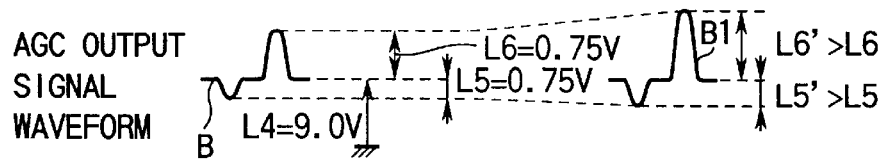

The output signal waveform B shown in FIG. 11B is the waveform of the output signal of the offset voltage AGC circuit and the waveform of the collector voltage of the transistor Tr1, which is applied to the both ends of the resistor R1. The waveform changes in proportion to the change of the input signal waveform A.

Figure 11C:
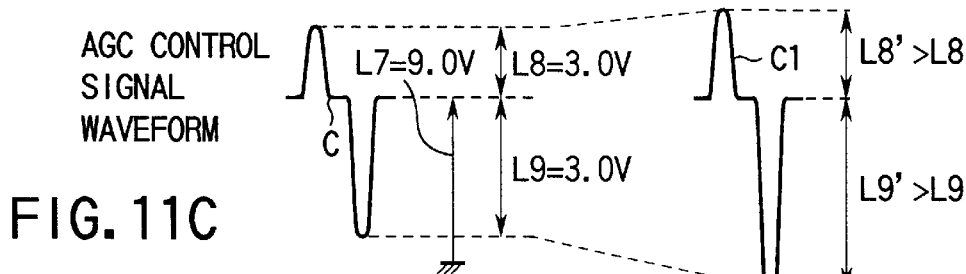

The AGC circuit control signal waveform C shown in FIG. 11C is the waveform of the collector voltage of the transistor Tr2, which is applied to the both ends of the resistor R2. The waveform changes in proportion to the change of the input signal waveform A, but has an inverted phase of that of the waveform B since the AGC circuit control signal is the differential amplified signal generated from the difference between the output of the transistor Tr1 and the output of the transistor Tr2.

Figure 11D:
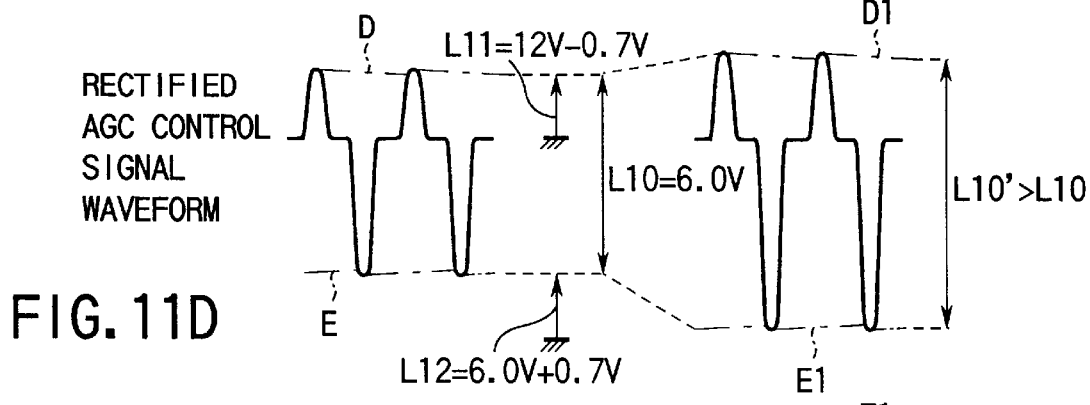

The rectified AGC circuit control signal waveform D shown in FIG. 11D is the waveform of the signal input into the resistor R13 connected to the non-inverting terminal of the operation amplifier OP1, and the waveform of the voltage applied to the both ends of the resistor R10 of the terminal-based detection circuit 132. The rectified AGC circuit control signal waveform E shown in FIG. 11D is the waveform of the signal input into the resistor R11 connected to the inverting terminal of the operation amplifier OP1, and the waveform of the voltage applied to the both ends of the resistor R9 of the terminal-based detection circuit 132.

Figure 11E:
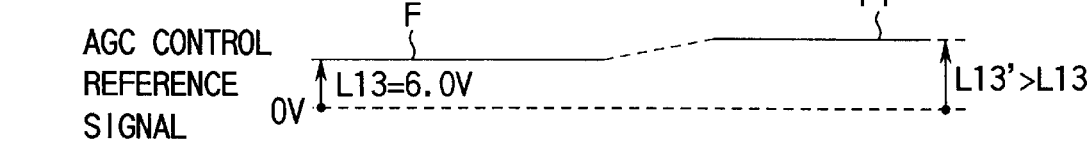

The AGC circuit control reference signal waveform F shown in FIG. 11E is the waveform of the voltage of the output signal of the operation amplifier OP1 of the differential amplifying circuit 133, which represents the absolute value of the AGC control signal waveform C.

Figure 11F:
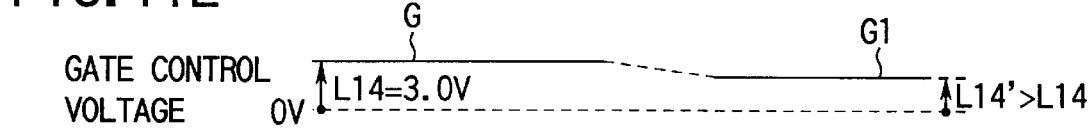

The gate control voltage waveform G shown in FIG. 11F is the waveform of the voltage of the output signal of the operation amplifier OP2 of the comparison circuit 134, which has an inverted phase of that of the AGC circuit control reference signal waveform F.

L1 in FIG. 11A shows the offset voltage level (at which the output pixel is "black") of the output signal of the quadruplex CCD 34, and normally set at a DC 4.0V. L2 represents the level of a reset pulse to reset the quadruplex CCD 34, and is normally set around 0.75V. L3 represents the level of a pixel signal output from the quadruplex CCD 34, and is set around 0.75V in the white shading correction.

L4 in FIG. 11A shows the voltage level of the AGC output signal, at which the output image is "black", and is set around 9.0V. This "black" level is the offset voltage level of the image signal of the AGC circuit, and serves as the output signal of the transistor differential amplifying circuit, and thus is set around 9.0V as a bias voltage. L5 and L6 are the levels of the input signal input into the image processing circuit, and need to be set at the same level as the amplification level of the input signal.

L7 is the offset voltage level (at which the output image is "black") of the AGC control signal. The AGC control signal is set around 9.0V as a bias voltage since the AGC control signal is the output of the transistor differential circuit.

L8 and L9 are the voltage level of the CCD output signal amplified to have the amplitude necessary to be detected by the terminal-based detection circuit. The ratio between the AGC output signal and the CCD output signal is determined by the ratio between the resistance values of the resistors R1 and R2. L11 is the voltage level of the upstream terminal of the AGC circuit in the envelop detection, and set at the value obtained by subtracting the voltage drop 0.7 at the diode from the peak value 12.0V.

L12 is the voltage level of the downstream terminal of the AGC circuit in the envelop detection, and set at the value obtained by adding the voltage drop 0.7 at the diode to the peak value 12.0V. L10 is the absolute output voltage level of 6.0V as the result of the envelop detection of the AGC circuit. L13 is the absolute output voltage level of 6.0V derived from the result of the envelop detection of the AGC circuit, as the voltage level of the AGC control reference signal. L14 is the voltage level necessary to drive the gate of the reference current generating circuit, which is obtained by converting the voltage level of the AGC control reference signal.

When the CCD output has the voltage amplitude larger than a predetermined value, the voltage of the input signal will become larger than that of the signal of the predetermined value, as shown in FIGS. 11A, 11B, 11C, 11D, and 11E by resultant L2', L3', L4', . . . and L13+. In FIG. 11F, the resultant voltage level L14' is lower than the voltage level L14 obtained from the input signal of the predetermined value since the AGC circuit is a negative feed-back control circuit. Since the voltage level of the AGC control reference signal is lowered, the reference current generated by the reference current generating circuit and input into the differential amplifying circuit as an input stage of the AGC circuit is decreased to attenuate the signal amplitude toward the desired level of the voltage: 0.75V.

Next, the operation of the offset voltage AGC circuit (the offset voltage AGC-M0 circuit 130, the offset AGC-S1 circuit 140, AGC-S2 circuit 150, AGC-S3 circuit 160) will be specifically described with reference to the signal waveforms shown in FIGS. 11A, 11B, 11C, 11D, 11E, and 11F.

Firstly, the operation of the offset voltage AGC-M0 circuit 130 shown in FIG. 9 will be described below.

When the amplitude of the CCD input signal waveform shown in FIG. 11A is larger than a predetermined one, the amplitude of the waveform denoted by A1 becomes larger than that obtained by the input of the predetermined value, and the amplitude of the AGC control signal waveform denoted by C1 also becomes larger than that obtained by the input of the predetermined value. In accordance therewith, the difference between the rectified AGC control signal waveform D1 and the waveform E1 also becomes larger, and the amplitude of the AGC control reference signal waveform F1 increases. The increased AGC control reference signal is then compared with the reference control value $V_{ref1}$ and the gate control voltage G1 as the output of the operation amplifier OP2 is decreased as shown in FIG. 11F.

The voltage of the reference AGC control signal represented by the waveform F1 serves as the gate voltage of the transistor Tr3 of the reference current generating circuit 136. Accordingly, the reference current generated by the reference current generating circuit 136 decreased, and thus the voltages of the collectors of the transistors Tr1 and Tr2 of the differential amplifying circuit 131 are decreased thereby. In this manner, the AGC output signal waveform B1 shown in FIG. 11B is set at the predetermined value, as a result.

This operation is attained also in the case where the input signal waveform A is smaller than the predetermined one. The small AGC output signal waveform B of FIG. 11B is set at the predetermined value by the operation as mentioned above.

The gate control voltage G obtained by the above operation is input as the reference control voltage $V_{ref2}$ into the AGC-S1 circuit 140, the AGC-S2 circuit 150, and the AGC-S3 circuit 160.

The operation of the AGC-S1 circuit 140 shown in FIG. 10 will be described next.

The input signal waveform A shown in FIG. 11A, the AGC output signal waveform B shown in FIG. 11B, the AGC control signal waveform C shown in FIG. 11C, the rectified AGC circuit control signal waveform D shown in FIG. 11D, the rectified AGC circuit control signal waveform E shown in FIG. 11D, the AGC circuit control reference signal waveform F shown in FIG. 11E, and the gate control voltage waveform G shown in FIG. 11F are the same as those described before.

When the amplitude of the CCD input signal waveform shown in FIG. 11A is larger than a predetermined value, the amplitude of the waveform denoted by A1 becomes larger than that obtained by the input of the predetermined value, and the amplitude of the AGC control signal waveform denoted by C1 also becomes larger than that obtained by the input of the predetermined value. In accordance therewith, the difference between the rectified AGC control signal waveform D1 and the waveform E1 also becomes larger, and the amplitude of the AGC control reference signal waveform F1 increases. The increased AGC control reference signal is then compared with the reference control value $V_{ref2}$ supplied from the AGC-M0 circuit 130. As a result, the gate control voltage G1 as the output of the operation amplifier OP2 is decreased as shown in FIG. 11F.

The voltage of the reference AGC control signal represented by the waveform F1 serves as the gate voltage of the transistor Tr3 of the reference current generating circuit 146. Accordingly, the reference current generated by the reference current generating circuit 146 decreased, and thus the voltages of the collectors of the transistors Tr1 and Tr2 of the differential amplifying circuit 141 are decreased thereby. In this manner, the AGC output signal waveform B1 shown in FIG. 11B is set at the predetermined value.

This operation is attained also in the case where the input signal waveform A is smaller than the predetermined voltage. The small AGC output signal waveform B of FIG. 11B is set at the predetermined value by the operation as described above.

Similarly to the AGC-S1 circuit 140, the AGC output waveform B of the AGC-S2 circuit 150 and the AGC-S3 circuit 160 is set at the predetermined value.

In this manner, the AGC outputs of all the four AGC circuits of the quadruplex CCD 34 are set at a predetermined pixel signal output level.

As described above, according to the above-mentioned embodiment of the present invention, the difference in the offset voltages of the image signals divided into four groups of the CCD of the image reading section of the electronic copying machine as an image forming apparatus is corrected by the negative feed-back control with use of the absolute voltage value of a white level pixel signal as a reference value, thereby the image having no image density difference due to the offset voltage difference caused by the division of the pixels of the CCD can be attained. Consequently, an electronic copying machine of the present invention can present a copy of an image with high quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image density correction device, comprising:
    a photoelectric conversion element having first and second blocks, for photoelectrically converting received light;
    first means for obtaining an absolute value of an amplitude of each of first and second output signals output from the first block of the photoelectric conversion element;
    second means for comparing the absolute values with predetermined reference values to obtain differences thereof;
    first correction means for correcting the first and second output signals on the basis of the differences obtained by the second means; and
    second correction means for correcting third and fourth output signals from the second block on the basis of the differences obtained by the second means.

2. An image density correction device according to claim 1, wherein the photoelectric conversion element outputs first and second output signals from the first block, and outputs third and fourth output signals from the second block.

3. An image density correction device according to claim 1, wherein the first means includes first differential amplifying circuits for dividing the first and second output signals from the first block into image signals and control signals, terminal-based detection circuits for detecting amplitude voltages of the first and second output signals from the control signals obtained by the first differential amplifying circuits, and second differential amplifying circuits for detecting an absolute value of an amplitude of the first and second output signals on the basis of the amplitude voltages detected by the terminal-based detection circuits.

4. An image density correction device according to claim 1, wherein the second means comprises comparison circuits for comparing the absolute values obtained by the first means with the predetermined reference values to obtain the differences thereof.

5. An image density correction device according to claim 1, wherein the first and second correction means include
    dividing means for dividing the plurality of output signals output from the photoelectric conversion element into image signals and control signals,
    first detection means for detecting amplitude voltages of the plurality of output signals from the control signals obtained by the dividing means,
    second detection means for detecting absolute values of an amplitude of the plurality of output signals on the basis of the amplitude voltage detected by the first detection means,
    comparison means for comparing the absolute amplitude voltage values obtained by the second detection means with the predetermined reference values to obtain error signal voltages,
    voltage holding means for holding the error signal voltages output from the comparison means,
    conversion means for converting the voltages held by the voltage holding means into electric currents, and
    correction means for correcting the image signals divided from the plurality of output signals of the photoelectric conversion element by the dividing means so as to have voltage of predetermined values with use of the electric currents converted from the voltages by the conversion means.

6. An image density correction method by which an output signal of a photoelectric conversion element receiving reflection light from an irradiated document is corrected, wherein the output signal of the photoelectric conversion element is divided into an image signal and a control signal, an amplitude voltage of the output signal is detected from the obtained control signal, an absolute value of an amplitude of the output signal is detected on the basis of the detected amplitude voltage, the obtained absolute value is compared with a predetermined reference value to obtain an error signal voltage, the obtained error signal voltage is held, the held voltage is converted into an electric current, and the image signal divided from the output signal of the photoelectric conversion element is corrected to have a predetermined voltage with use of the electric current converted from the held voltage.

7. An image reading device which irradiates a document and reads an image of the document with use of a photoelectric conversion element having first and second blocks and photoelectrically converting received light reflected from the document by correcting an output signal from the photoelectric conversion element, comprising:
    first means for obtaining an absolute value of an amplitude of each of first and second output signals output from the first block of the photoelectric conversion element;
    second means for comparing the absolute values with predetermined reference values to obtain differences thereof;
    first correction means for correcting the first and second output signals on the basis of the differences obtained by the second means;
    second correction means for correcting third and fourth output signals output from the second block on the basis of the differences obtained by the second means;
    transfer means for receiving the first and second output signals corrected by the first correction means and the third and fourth output signals corrected by the second correction means, and correcting a pixel arrangement of the output signals, thereby obtaining an original output signal, and then outputting the original output signal; and processing means for processing the original output signal which is output from the transfer means and has the original pixel arrangement.

8. An image reading device which irradiates a document and reads an image of the document with use of a quadruplex photoelectric conversion element for dividing image data into four groups and photoelectrically converting received light reflected from the document by correcting first, second, third, and fourth output signals from the quadruplex photoelectric conversion element, comprising:

first correction means for dividing the first output signal output from the quadruplex photoelectric conversion element into an image signal and a control signal, comparing an absolute value of the control signal with a predetermined reference value, and correcting the divided image signal to have a predetermined voltage with use of an error signal obtained by the comparison;

second correction means for dividing the second output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as a reference value from the first correction means;

third correction means for dividing the third output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means;

fourth correction means for dividing the fourth output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means;

transfer means for transferring the image signal corrected by the first correction means, the image signal corrected by the second correction means, the image signal corrected by the third correction means, and the image signal corrected by the fourth correction means by which a pixel arrangements of the image signals are corrected to an original one; and processing means for processing the output signals which are transferred from the transfer means and have the original pixel arrangement.

9. An image reading device according to claim 8, wherein the quadruplex photoelectric conversion element receives the reflected light from four pixel groups obtained by dividing an entire image region of the document in a main scanning direction into an upper region and a lower region and further dividing all pixels in the image regions of the document into odd and even pixels.

10. An image forming apparatus which irradiates a document and forms an image of the document on the basis of a corrected signal output from a photoelectric conversion element having first and second blocks and photoelectrically converting received reflected light from the document, comprising:

first means for obtaining an absolute value of an amplitude of first and second output signals output from the first block of the photoelectric conversion element;

second means for comparing the absolute values with predetermined reference values to obtain differences thereof;

first correction means for correcting the first and second output signals on the basis of the differences obtained by the second means;

second correction means for correcting third and fourth output signals output from the second block on the basis of the differences obtained by the second means;

transfer means for receiving the first and second output signals corrected by the first correction means and the third and fourth output signals corrected by the second correction means, and correcting a pixel arrangement of the output signals, thereby obtaining an original output signal, and then outputting the original output signal;

processing means for processing the original output signal which is output from the transfer means and has the original pixel arrangement; and image forming means for forming the image on the basis of the original output signal processed by the processing means.

11. An image forming apparatus which irradiates a document and forms an image on the basis of corrected first, second, third, and fourth output signals from a quadruplex photoelectric conversion element dividing image data into four groups and photoelectrically converting received light reflected from the document, comprising:

first correction means for dividing the first output signal output from the quadruplex photoelectric conversion element into an image signal and a control signal, comparing an absolute value of the control signal with a predetermined reference value, and correcting the image signal to have a predetermined voltage with use of an error signal obtained by the comparison;

second correction means for dividing the second output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as a reference value from the first correction means;

third correction means for dividing the third output signal output from the quadruplex photoelectric conversion element into an image signal and a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means;

fourth correction means for dividing the fourth output signal output from the quadruplex photoelectric conversion element into an image signal and, a control signal, comparing an absolute value of the control signal with the error signal obtained by the first correction means as a predetermined reference value, and correcting the image signal to have a predetermined voltage with use of an error signal voltage obtained by the comparison of the absolute value and the error signal output as the reference value from the first correction means;

transfer means for transferring the image signal corrected by the first correction means, the image signal corrected by the second correction means, the image signal corrected by the third correction means, and the image signal corrected by the fourth correction means by which a pixel arrangements in the output signals are corrected to an original one;

processing means for processing the output signals transferred from the transfer means and have the original pixel arrangement; and image forming means for forming the image on the basis of the output signal processed by the processing means.

12. An image density correction device, comprising:

a photoelectric conversion element having first and second blocks, to photoelectrically convert received light;

a first circuit which obtains an absolute value of an amplitude of each of first and second output signals output from the first block of the photoelectric conversion element;

a second circuit which compares the absolute values with predetermined reference values to obtain differences thereof;

a first correction circuit which corrects the first and second output signals on the basis of the differences obtained by the second circuit; and a second correction circuit which corrects third and fourth output signals from the second block on the basis of the differences obtained by the second circuit.

13. An image reading device which irradiates a document and reads an image of the document with use of a photoelectric conversion element having first and second blocks and photoelectrically converting received light reflected from the document by correcting an output signal from the photoelectric conversion element, comprising:

a first circuit which obtains an absolute value of an amplitude of each of first and second output signals output from the first block of the photoelectric conversion element;

a second circuit which compares the absolute values with predetermined reference values to obtain differences thereof;

a first correction circuit which corrects the first and second output signals on the basis of the differences obtained by the second circuit;

a second correction circuit which corrects third and fourth output signals output from the second block on the basis of the differences obtained by the second circuit;

a transfer circuit which receives the first and second output signals corrected by the first correction circuit and the third and fourth output signals corrected by the second correction circuit, and corrects a pixel arrangement of the output signals, thereby obtaining an original output signal, and then outputs the original output signal; and a processor which processes the original output signal which is output from the transfer circuit and has the original pixel arrangement.

14. An image reading device which irradiates a document and reads an image of the document with use of a quadruplex photoelectric conversion element for dividing image data into four groups and photoelectrically converting received light reflected from the document by correcting first, second, third, and fourth output signals from the quadruplex photoelectric conversion element, comprising:

a first correction circuit which divides the first output signal output from the quadruplex photoelectric conversion element into an image signal and a control signal, compares an absolute value of the control signal with a predetermined reference value, and corrects the dividing image signal to have a predetermined voltage with use of an error signal obtained by the comparison;

a second correction circuit which divides the second output signal output from the quadruplex photoelectric conversion element into an image signal and a control signal, compares an absolute value of the control signal with the error signal obtained by the first correction circuit as a predetermined reference value, and corrects the image signal to have a predetermined voltage with use of an error signal voltage obtained by the comparison of the absolute value and the error signal output as a reference value from the first correction circuit;

a third correction circuit which divides the third output signal output from the quadruplex photoelectric conversion element into an image signal and a control signal, compares an absolute value of the control signal with the error signal obtained by the first correction circuit as a predetermined reference value, and corrects the image signal to have a predetermined voltage with use of an error signal voltage obtained by the comparison of the absolute value and the error signal output as a reference value from the first correction circuit;

a fourth correction circuit which divides the fourth output signal output from the quadruplex photoelectric conversion element into an image signal and a control signal, compares an absolute value of the control signal with the error signal obtained by the first correction circuit as a predetermined reference value, and corrects the image signal to have a predetermined voltage with use of an error signal voltage obtained by the comparison of the absolute value and the error signal output as a reference value from the first correction circuit;

a transfer circuit which transfers the image signal corrected by the first correction circuit, the image signal corrected by the second correction circuit, the image signal corrected by the third correction circuit, and the image signal corrected by the fourth correction circuit by which pixel arrangements of the image signals are corrected to an original one; and a processor which processes the output signals which are transferred from the transfer circuit and have the original pixel arrangement.

15. An image forming apparatus which irradiates a document and forms an image of the document on the basis of a corrected signal output from a photoelectric conversion element having first and second blocks and photoelectrically converting received reflected light from the document, comprising:

a first circuit which obtains an absolute value of an amplitude of first and second output signals output from the first block of the photoelectric conversion element;

a second circuit which compares the absolute values with predetermined reference values to obtain differences thereof;

a first correction circuit which corrects the first and second output signals on the basis of the differences obtained by the second circuit;

a second correction circuit which corrects third and fourth output signals output from the second block on the basis of the differences obtained by the second circuit;

a transfer circuit which receives the first and second output signals corrected by the first correction circuit and the third and fourth output signals corrected by the second correction circuit, and corrects a pixel arrangement of the output signals, thereby obtaining an original output signal, and then outputs the original output signal;

a processor which processes the original output signal which is output from the transfer circuit and has the original pixel arrangement; and an image forming circuit which forms the image on the basis of the original output signal processed by the processor.

16. An image reading device which irradiates a document and reads an image of the document with use of a quadruplex photoelectric conversion element for dividing image data into four groups and photoelectrically converting received light reflected from the document by correcting first, second, third, and fourth output signals from the quadruplex photoelectric conversion element, comprising:

a first correction circuit which divides the first output signal output from the quadruplex photoelectric conversion element into an image signal and a control signal, compares an absolute value of the control signal with a predetermined reference value, and corrects the dividing image signal to have a predetermined voltage with use of an error signal obtained by the comparison;

a second correction circuit which divides the second output signal output from the quadruplex photoelectric conversion element into an image signal and a control signal, compares an absolute value of the control signal with the error signal obtained by the first correction circuit as a predetermined reference value, and corrects the image signal to have a predetermined voltage with use of an error signal voltage obtained by the comparison of the absolute value and the error signal output as a reference value from the first correction circuit;

a third correction circuit which divides the third output signal output from the quadruplex photoelectric conversion element into an image signal and a control signal, compares an absolute value of the control signal with the error signal obtained by the first correction circuit as a predetermined reference value, and corrects the image signal to have a predetermined voltage with use of an error signal voltage obtained by the comparison of the absolute value and the error signal output as a reference value from the first correction circuit;

a fourth correction circuit which divides the fourth output signal output from the quadruplex photoelectric conversion element into an image signal and a control signal, compares an absolute value of the control signal with the error signal obtained by the first correction circuit as a predetermined reference value, and corrects the image signal to have a predetermined voltage with use of an error signal voltage obtained by the comparison of the absolute value and the error signal output as a reference value from the first correction circuit;

a transfer circuit which transfers the image signal corrected by the first correction circuit, the image signal corrected by the second correction circuit, the image signal corrected by the third correction circuit, and the image signal corrected by the fourth correction circuit by which pixel arrangements of the image signals are corrected to an original one;

a processor which processes the output signals which are transferred from the transfer circuit and have the original pixel arrangement; and an image forming circuit which forms the image on the basis of the output signal processed by the processor.

* * * * *